United States Patent [19]

Richardson

[11] 3,889,753
[45] June 17, 1975

[54] BUFFER REGULATED MUD ACID
[75] Inventor: Edwin A. Richardson, Houston, Tex.
[73] Assignee: Shell Oil Company, Houston, Tex.
[22] Filed: Feb. 21, 1974
[21] Appl. No.: 444,207

[52] U.S. Cl............. 166/307; 166/300; 252/8.55 C
[51] Int. Cl............................................. E21b 43/27
[58] Field of Search ........... 166/307, 308, 271, 281, 166/259, 282, 304, 300

[56] References Cited
UNITED STATES PATENTS
2,680,009  9/1954  Brainerd et al..................... 166/307
3,543,856  12/1970  Knox et al. ......................... 166/281
3,828,854  8/1974  Templeton et al.................. 166/307

Primary Examiner—Stephen J. Novosad
Assistant Examiner—George A. Suckfield
Attorney, Agent, or Firm—H. W. Coryell

[57] ABSTRACT

In reacting a siliceous material with an acidic solution containing hydrogen fluoride, the reaction rate is kept relatively low by contacting the material with an aqueous solution of a fluoride salt, a weak acid and a weak acid salt in proportions that maintain a significant but low concentration of hydrogen fluoride in the solution.

12 Claims, 4 Drawing Figures

BUFFER REGULATED MUD ACID

BACKGROUND OF THE INVENTION

The invention relates to contacting a siliceous material such as those encountered in or around the borehole of a well with an acidic solution of hydrogen fluoride that is adapted to dissolve silica or clay, i.e., a "mud acid." The invention provides a way of maintaining a relatively slow rate of reaction.

Numerous methods have been proposed for reducing the rate of the acidization reactions of a mud acid, particularly in acidizing clayey or siliceous subterranean earth formations. The prior proposals have included: dissolving or emulsifying the acid or the acid-forming materials in a non-aqueous liquid; forming the acid in a water-containing remote location, such as a subterranean reservoir, by means of a relatively slow hydrolysis of an organic halide or ester; dissolving a water-thickening material in the acid to reduce the rate at which the acidic components can diffuse into contact with the material being acidized, etc. Such prior procedures are subject to various disadvantages.

SUMMARY OF THE INVENTION

In accordance with this invention, a siliceous material is reacted relatively slowly with an aqueous hydrogen fluoride-containing acid by contacting the material with an aqueous solution of a fluoride salt, a weak acid and a weak acid salt in proportions that form a significant but low concentration of hydrogen fluoride. The solute concentrations are preferably correlated so that the fluoride salt concentration is equivalent to at least a clay-dissolving concentration of hydrogen fluoride, the weak acid concentration is sufficient to convert at least an effective amount of fluoride salt to hydrogen fluoride, and the weak acid salt concentration is sufficient to provide a ratio of weak acid to weak acid salt that limits the rate of reaction.

In a preferred embodiment, the present invention provides a buffer-regulated mud acid comprising an aqueous solution of an amount of fluoride salt equivalent to a hydrogen fluoride concentration of from about 0.1 to 3 molar, a concentration of weak acid sufficient to convert a significant proportion of the fluoride salt to hydrogen fluoride, and enough weak acid salt to provide a weak acid to weak acid salt ratio that buffers the pH of the solution at a value of from about 3 to 6.

DESCRIPTION OF THE INVENTION

Figure 1:
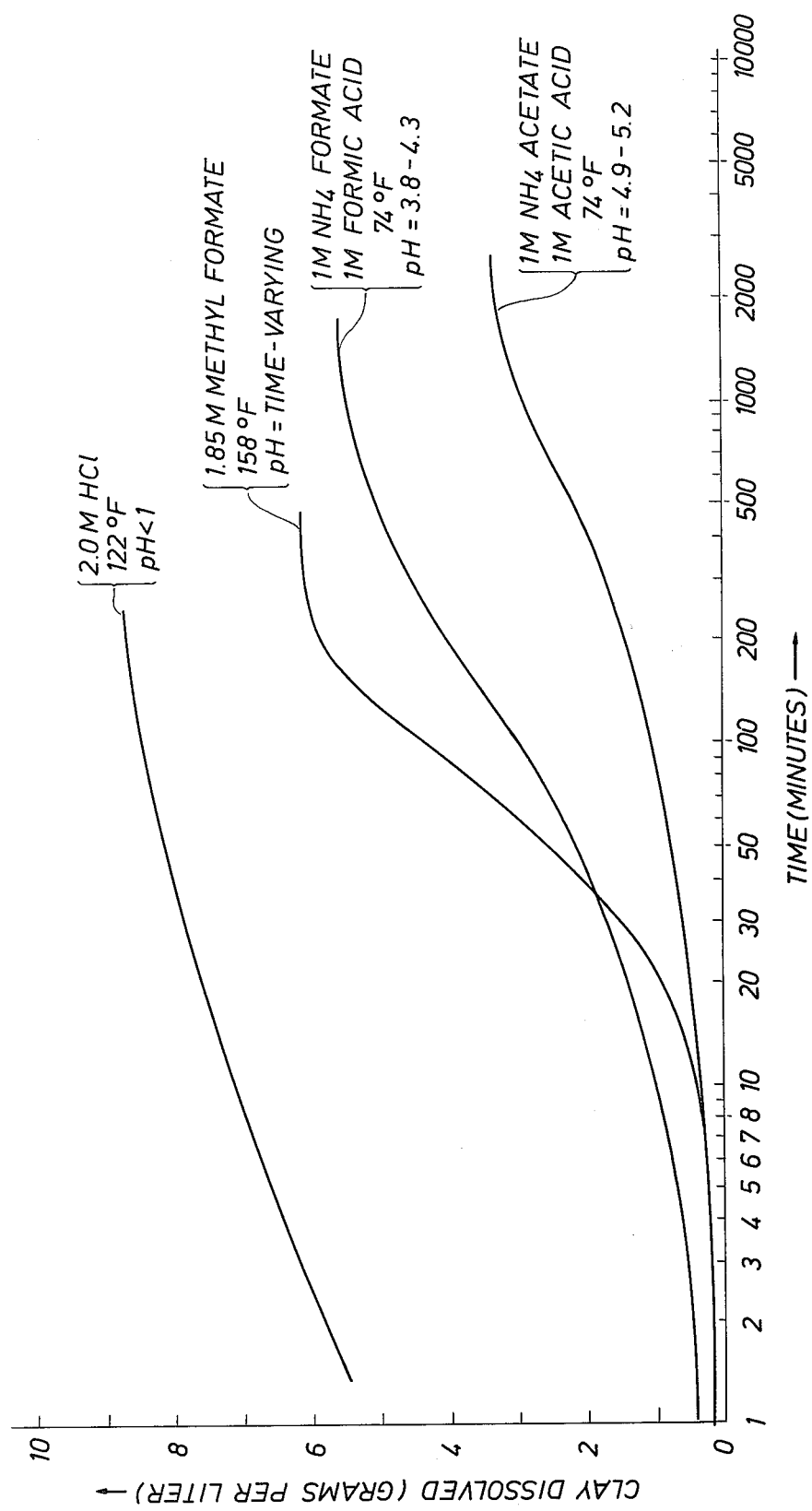
FIGS. 1 and 2 are graphic illustrations of the amount of clay dissolved with time by various mud acid solutions.

The rates at which the mud acid solutions of the present invention react with an acid-reactive material are kept low by limiting the concentrations of hydrogen fluoride and ionized weak acid in the solutions. Those concentrations are limited by the buffering action of the mixtures of weak acids and weak acid salts that are dissolved in the solutions.

In an aqueous solution a weak acid ionizes only to the extent required to provide concentrations of respectively, unionized weak acid, hydronium ions, and weak acid anions, that satisfy the ionization constant for that acid. The reaction is an equilibrium reaction. If the salt of a weak acid salt is dissolved along the weak acid, the salt ionizes to yield additional weak acid anions and this causes the concentration of hydronium ions that are needed to satisfy the ionization constant to be reduced.

In the present mud acid solutions, an adequate supply of fluoride anions is provided by the ionization of the dissolved fluoride salt. But, the formation of a molecule of hydrogen fluoride requires a combination of a hydronium ion and a fluoride anion. Since the concentration of hydronium is kept low by the buffering action, so is the concentration of hydrogen fluoride. These are both regulated by the buffering action of the weak acid and weak acid salt. In acidizing a siliceous material, the low concentration of the hydrogen fluoride molecules severely limits the rate at which those molecules (of which a relatively few are distributed throughout the total volume of the solution) can come into contact with the siliceous material.

The total amount of siliceous material that is ultimately acidized by a given amount of a mud acid solution of the present invention is not similarly limited by the low concentration of hydrogen fluoride molecules. Each reaction that removes a molecule of hydrogen fluoride has the effect of reducing a concentration being kept in equilibrium within the solution (by removing a hydronium ion). This allows another hydronium ion to be formed (by ionizing of another molecule of the weak acid) and thus allows another molecule of hydrogen fluoride to be formed (by the association of the hydronium ion with a fluoride anion). Therefore, as long as the concentrations of the essential solutes are adequate, but not excessive, the pH of the solutions and the rates of the acidization reactions of the solutions are regulated and are kept substantially constant by the buffering action.

Such a buffer-regulated reduction of the rate of acidization is uniquely advantageous. Particularly when the ratio of weak acid to weak acid salt is low enough to provide a relatively high pH, the low concentration of hydronium ions reduces the rate of acidizing any acid reactive material (e.g. carbonates as well as clays) in a manner analagous to that described above. Similarly, each reaction that removes a hydronium ion depletes the equilibrium concentration in a manner that causes the formation of another hydronium ion, and the ratio of weak acid to weak acid salt is primarily controlling on the rate of reaction, and the concentration of the weak acid-weak acid salt mixture is primarily controlling on the amount of material that will be acidized by a given volume of the solution.

In such a buffer-regulated acid solution, where the pH is relatively high, the solution is relatively slowly reactive with the carbonated minerals (such as calcium carbonate) that are often encountered in calcarious sandstones or the like subterranean reservoirs. Such a buffer-regulation of the rate of a carbonate mineral acidization is more completely described in the co-pending E. A. Richardson patent application Ser. No. 436,289 filed Jan. 24, 1974.

The present buffer-regulated mud acids are adapted to have a relatively high pH at which they are uniquely insensitive to the presence of carbonate minerals.

Where carbonate minerals are apt to be encountered and a conventional mud acid is to be used, a pretreatment with an acid that is free of hydrogen fluoride is required. A conventional mud acid tends to dissolve calcium ions (or the ions of other alkaline earth metals) and such ions react with hydrogen fluoride and form insoluble precipitates. The present mud acids can be buffer-regulated at a pH that is high enough to severely limit the rate of their reaction with carbonate minerals and may avoid the undesirable calcium ion induced-precipitation with little or no treatment with a hydrogen fluoride-free acid.

The aqueous liquid used in the present buffer regulated mud acids can be pure water or substantially any relatively dilute aqueous liquid that is compatible with fluoride salts, weak acids, weak acid salts, and the acifidication reaction products of hydrogen fluoride and siliceous materials. Such aqueous liquids can advantageously contain additives such as corrosion inhibitors, wetting agents, detergents, oil solvents, oil and water mutual solvents, water thickening agents, suspended particles (such as fracture propping particles, or sand or gravel pack-forming particles) and can contain additives such as those conventionally utilized in forming and/or acidizing fractures or sand packs, or gravel packs, or the like. Particularly suitable aqueous liquids comprise water or relatively dilute, soft, saline solutions.

Fluoride salts suitable for use in the present invention comprise substantially any relatively water soluble fluoride salt. Ammonium fluoride and ammonium bifluoride are particularly suitable. Where ammonium bifluoride is used, it is preferable to add sufficient ammonia or ammonium hydroxide to provide substantially equivalent proportions of ammonium and fluoride ions.

Weak acids suitable for use in the present invention comprise substantially any that dissolve in water to form an acidic solution adapted to convert fluoride anions to hydrogen fluoride. Examples of suitable weak acids include: water soluble fatty acids such as formic acid, acetic acid, and the like; substituted water soluble organic acids such as chloroacetic acid, hydroxyacetic acid, and the like; various water soluble polycarboxylic acids such as citric acid, and the like. The weak acids can be used in the form of individual acids or mixtures of acids. Particularly suitable weak acids are formic acid, acetic acid, and citric acid.

Weak acid salts suitable for use in the invention comprise substantially any water soluble salts of the weak acids of the type described above. Examples of suitable weak acid salts include the ammonium or alkali metal salts of such acids, such as ammonium formate, sodium acetate, the sodium citrates, etc. The weak acid salts can be used as individual salts or as mixtures of salts. The salt of a given weak acid can be used with that weak acid or with one or more different weak acids. For example, a relatively small proportion of a weak acid salt that is adapted to provide a relatively high pH when it is dissolved in an aqueous solution along with a given weak acid can be used along with a salt of a different weak acid so that, due to the mixture of weak acid salts, the pH is initially kept at a higher value than that which is later maintained. Particularly suitable weak acid salts includes the sodium, potassium or ammonium acetates, formates or citrates.

Where it is desirable to provide a buffer-regulated mud acid solution that causes an initially rapid and/or extensive acidization of a siliceous material (or other acid-reactive material) a portion of strong acid can be dissolved in the solution. As long as the strong acid is present, it overrides the buffering action and depresses the pH of the solution. As soon as the strong acid is depleted, the pH rises and the rate of acidization decreases and becomes the relatively low rate established by the buffering action.

In making up, or compounding, the present acid solutions, the reactants can be mixed in substantially any order and/or formed within the aqueous solution. For example, in preparing a buffer-regulated mud acid containing ammonium fluoride, acetic acid and ammonium acetate, the solution can be formed by mixing an aqueous liquid with ammonium fluoride and/or ammonium bifluoride or acetic acid and/or acetic anhydride, in any order, and then adding enough ammonia or ammonium hydroxide to provide a concentration of ammonium ions exceeding the concentration of fluoride ions by an amount corresponding to a selected ratio of acetic acid to ammonium acetate. The components of the present acid solutions can be mixed at a surface location near the wall, within the conduits in a well, or at a location remote from the well from which the buffer-regulated acid solutions are transported to the well by means of containers and/or pipelines that are free of materials that are reactive with hydrogen fluoride or a weak acid.

The concentrations of the components of the present buffer-regulated mud acids can vary over relatively wide ranges. It is generally desirable that the concentration of the fluoride salt be equivalent to at least about 0.1 molar hydrogen fluoride solution (with concentrations equivalent to from about 1 to 2 moles per liter of hydrogen fluoride being preferred). If desired, the amount of siliceous material to be acidized by a given volume of a buffer regulated acid solution can be increased by using a relatively high concentration of fluoride salt and sufficient weak acid to convert it to hydrogen fluoride. However, where a relatively large amount of siliceous material is to be acidized, it is generally preferable to contact the material with a buffer-regulated mud acid containing a preferred concentration of the essential components and to keep contacting it with successive portions of the solution (in batches or continuously) to the extent required to acidize the desired amount of the material.

In the present solutions, the concentration of the weak acid is preferably at least sufficient to convert the dissolved fluoride salt to a concentration of hydrogen fluoride that is effective for acidizing a siliceous material, e.g. to provide a hydrogen fluoride concentration of at least about 0.1 moles per liter. The concentration of weak acid can be greater; for example, to provide a relatively low pH and relatively high rate of reaction and/or capacity for acidizing a weak acid-reactive material per volume of solution. In formulating the present buffer-regulated mud acids, the types and concentrations of the weak acid and weak acid salt can be adjusted relatively to each other to provide a selected pH (and rate of acidization reaction). For a given weak acid and weak acid salt, the pH is inversely proportional to, and is primarily dependent upon the molar ratio of the acid to the salt. For a given weak acid and a given ratio of weak acid to weak acid salt, the pH can be varied by varying the composition of the salt; for example, by using a salt of an exceptionally weak acid to provide a relatively high pH, or using the salt of a nominally weak acid to provide a lower pH, or the like. In general, the amount of siliceous material that can be acidized by a given volume of the solution is determined primarily by the concentration of the mixture of fluoride salt and weak acid. The rate at which such an acidization can occur is controlled primarily by the ratio of the concentrations of the weak acid and the weak acid salt.

Laboratory Tests

Comparative tests were made of the rates of clay-dissolving reactions of various mud acid solutions of the present and prior types at various temperatures. In such tests, the acid solutions were slurried with large excesses of sodium bentonite clay and were continuously stirred at constant temperature. Samples were withdrawn at various times and were analyzed for the amount of silica in solution, the fluoride ion content of the solution, the pH, and the undissolved bentonite clay content, and the like properties.

FIG. 1 shows the grams per liter of clay dissolved per minute of reaction time. The reactions were conducted at the indicated temperatures and, in each case, a 23 milliliter portion of a suspension of 86 grams per liter of sodium bentonite clay in water mixed with a 77 ml portion of a solution containing one mole per liter of ammonium fluoride in addition to the other components listed on the Figure. The solution containing 2 M HCl is typical of a conventional mud acid solution. It reacted very rapidly and dissolved a relatively large amount of clay, most of which was dissolved within the first two minutes.

The solution containing 1.85 M methyl formate is typical of the self-generating mud acids that are described in the co-pending patent application of C. C. Templeton, E. H. Street, Jr., and E. A. Richardson, Ser. No. 351,739, filed Apr. 16, 1973 now abandoned, but continued-in-part in U.S. Pat. No. 3,828,854. As indicated, the rate of its reaction is significantly delayed, with little reaction occuring before about the first 20 minutes. In such a solution an organic acid is formed in situ by means of a relatively slow hydrolysis of an organic acid ester, such as methyl formate.

In FIG. 1, the present buffer-regulated mud acid solutions are typified by those containing (a) 1 M ammonium formate and 1 M formic acid and (b) 1 M ammonium acetate and 1 M acetic acid. As indicated, these solutions have relatively very low rates of reaction, and the rate of reaction of the solution (a), which has a lower pH, is significantly faster than that of the solution (b).

Figure 2:
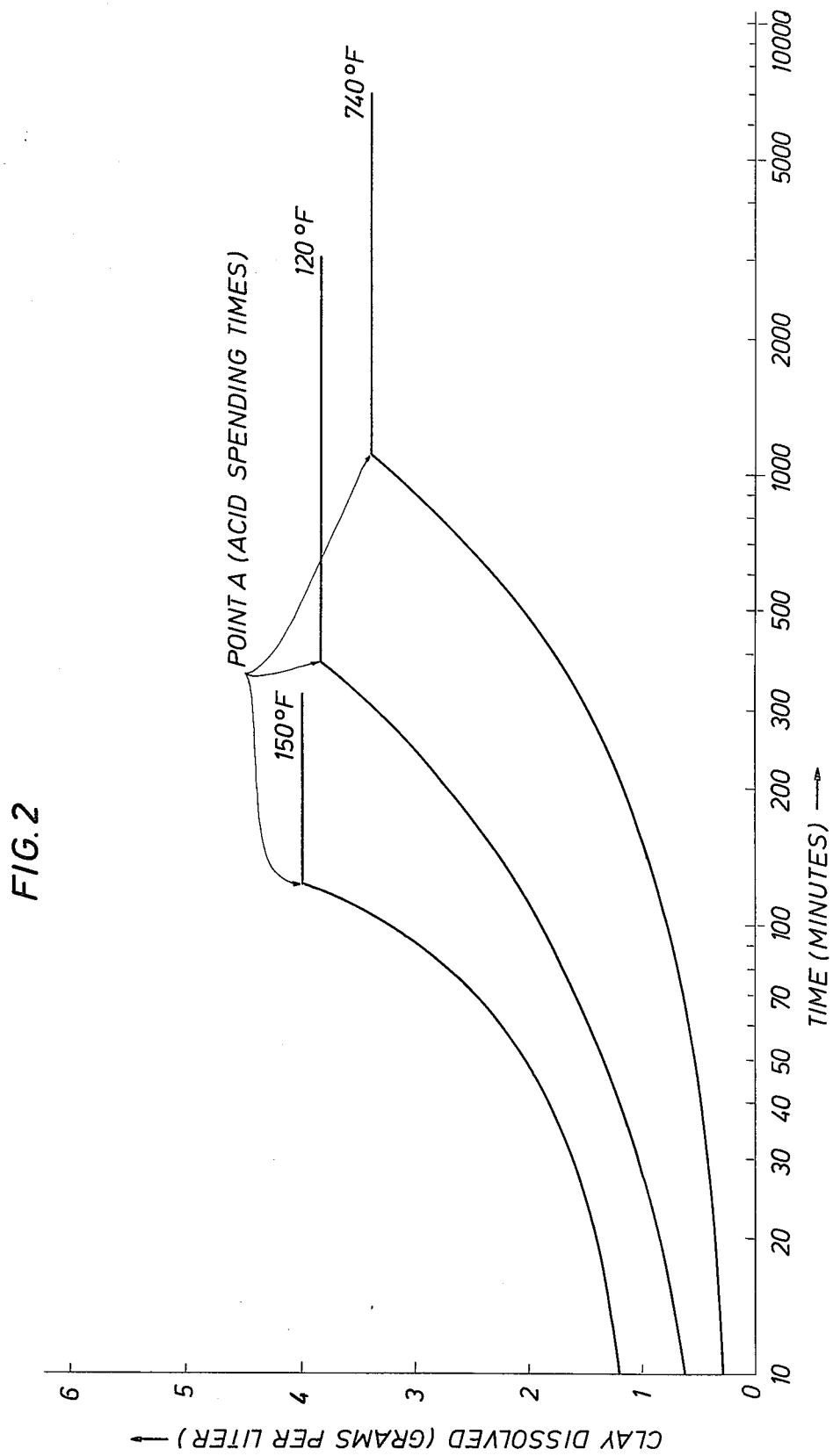

FIG. 2 shows the grams per liter of clay dissolved per minute of reaction time. The solutions used each contained 1 mol per liter of, respectively, ammonium fluoride, acetic acid, and ammonium acetate. The times at which the maximum values of dissolved silica first occurs are designated as the acid "spending times" and are denoted by the points A on the Figure. Such spending times are approximations derived by extrapolations between points. As shown, in the reactions at temperatures of 75°, 120°, and 150°F, the total amounts of clay dissolved were substantially the same, but the acid spending times ranged from about 2 hours to 5 days.

Figure 3:
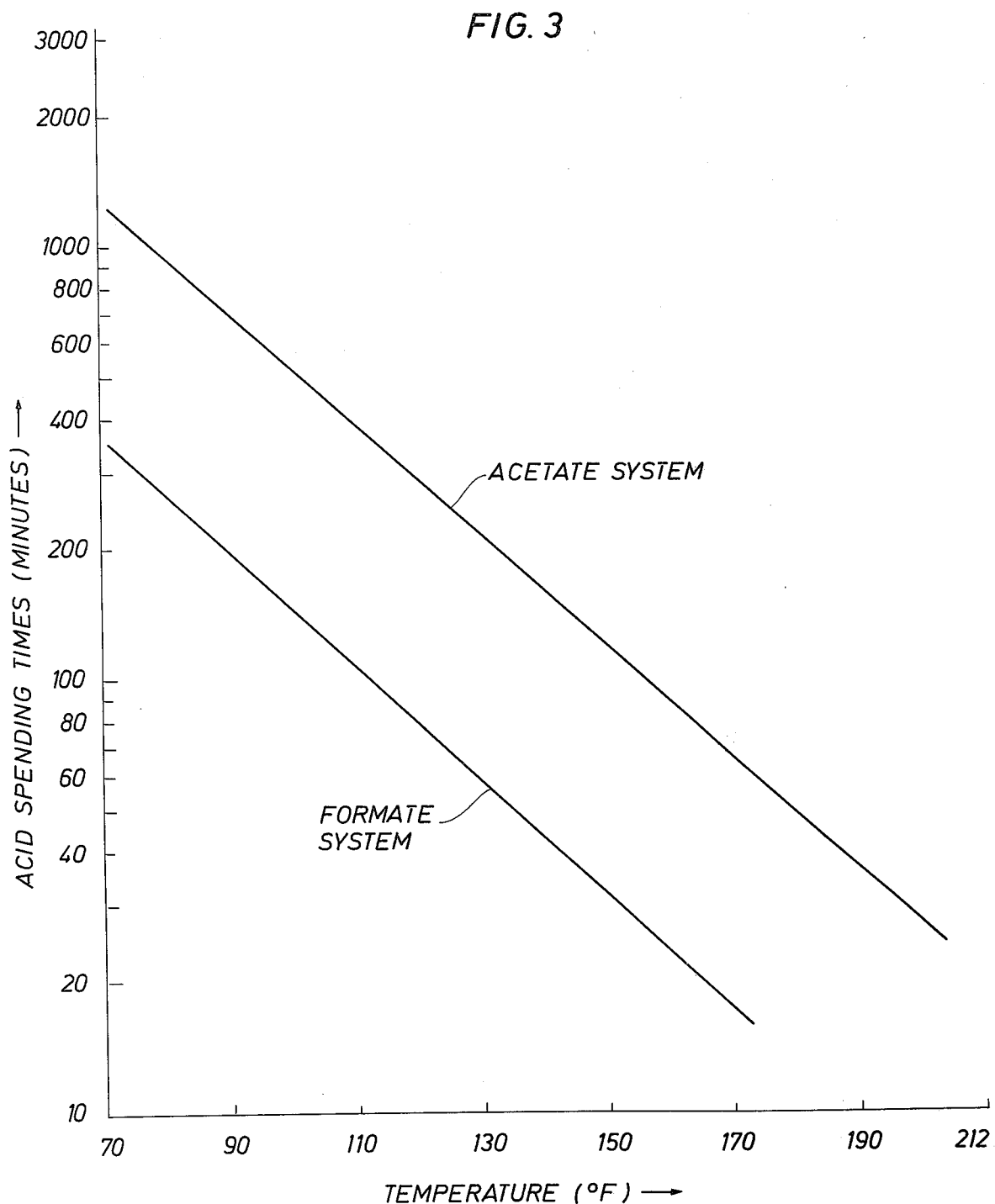
FIG. 3 graphically illustrates variations in acid spending time with changes in the reaction temperature of mud acid solutions of this invention.

FIG. 3 shows the variations in acid spending times with changes in temperature. The solutions used were those of an "Acetate System" in which each solution was one molar with respect to each of ammonium fluoride, acetic acid and ammonium acetate and a "Formate System" in which each solution was one molar with respect to each of ammonium fluoride, formic acid, and ammonium formate. As indicated, the reaction rates are substantially doubled for each increase of 20°F in temperature.

Table 1 lists data from typical reactions of the above type of various acetate and formate-containing buffer-regulated mud acids of the present invention. Such data indicates that the total dissolvable amount of silica is primarily affected by the pH of the solution, rather than the initial concentration of the fluoride ions. This depends on the fluoride ion concentration being in excess of the amount needed to dissolve all of the silica that can be dissolved during the reaction. In the present tests, such an excess was provided ammonium fluoride concentrations exceeding about 1 mole per liter.

TABLE 1

| | Initial Concentrations | | | | | Final Equilibrium Concentrations | | | | Spending Time (Point A) |
|---|---|---|---|---|---|---|---|---|---|---|
| | | | | | | Suspended Solids[*1] (Clay + Products) | | $SiO_2$[*3] | | |
| T°F | Clay[*2] g/l | $NH_4F$ M/l | HA[*5] M/l | $NH_4A$[*5] M/l | pH | g/l | % Acid Soluble | g/l | pH | Minutes |
| | | | | A - ACETATE SYSTEM | | | | | | |
| 74  | 20 | 1.0    | 1.0 | 1.0 | 4.9 | 19  | 15 | 3.3     | 5.2 | 1070 |
| 150 | 20 | 1.0    | 1.0 | 1.0 | 4.9 | 10  | 21 | 3.8     | 5.5 | 125 |
| 120 | 20 | 1.0    | 1.0 | 1.0 | 4.7 | —   | —  | 4.0     | 5.4 | 300 to 400 |
| 120 | 20 | 1.0    | 2.0 | 1.0 | 4.7 | 11  | 34 | 4.0     | 5.2 | 300 |
| 150 | 20 | 1.5    | 1.5 | 1.5 | 4.9 | 3.2 | 72 | 3.9     | 5.5 | 125 |
| 150 | 40 | 2.0    | 2.0 | 2.0 | 5.4 | 25  | 27 | 3.3     | 5.7 | 125 |
| 150 | 40 | 2.0    | 2.0 | 2.0 | 5.8 | 19  | —  | 3.8     | 5.8 | — |
| 150 | 20 | 1.0    | 1.0 | 1.0 | 4.9 | 10  | 44 | 3.7     | 5.5 | 190 |
| 150 | 20 | 1.0[*4]| 1.5 | 0.5 | 4.6 | 11  | —  | 4.3     | 4.9 | 100 |
| 150 | 20 | 1.0    | 2.0 | 2.0 | 5.2 | —   | —  | 3.2–4.2 | 5.5 | 130 |
| 150 | 20 | 0.5    | 1.0 | 1.0 | 4.8 | 13  | 22 | 2.3     | 5.2 | 300 |
| 150 | 20 | 0.5    | 1.5 | 0.5 | 4.4 | 10  | 34 | 2.6     | 4.6 | 120 |

TABLE 1 — Continued

| | | Initial Concentrations | | | | | Final Equilibrium Concentrations | | | Spending Time (Point A) |
|---|---|---|---|---|---|---|---|---|---|---|
| | | | | | | Suspended Solids*¹ (Clay + Products) | | | | |
| T°F | Clay*² g/l | NH₄F M/l | HA*⁵ M/l | NH₄A*⁵ M/l | pH | g/l | % Acid Soluble | SiO₂*³ g/l | pH | Minutes |
| | | | | B - FORMATE SYSTEM | | | | | | |
| 74 | 20 | 1.0 | 1.0 | 1.0 | 3.8 | 13 | 26 | 5.0 | 4.3 | 320 |
| 150 | 20 | 1.0 | 1.0 | 1.0 | 3.8 | 10 | 43 | 5.2 | 4.3 | 31 |
| 120 | 20 | 1.0 | 1.0 | 1.0 | 3.9 | — | — | 5.4 | 4.4 | — |
| 120 | 20 | 1.0 | 3.0 | 1.0 | 3.5 | — | — | 5.0 | 3.9 | 75 to 100 |
| 150 | 20 | 1.0 | 1.0 | 1.0 | 3.8 | 13 | 68 | 5.2 | 4.4 | 50 |

*⁵ A + anion (acetate in acetate system and formate in formate system).
*⁴ Obtained from NH₄F HF.
*³ To obtain approximate clay equivalent multiply SiO₂ by 1.7.
*² This bentonite used contained only 89 percent Na montmorillonite so that actual starting concentration of clay is 17.8 g/l.
*¹ Values here can be seriously in error due to sampling difficulties.

Figure 4:
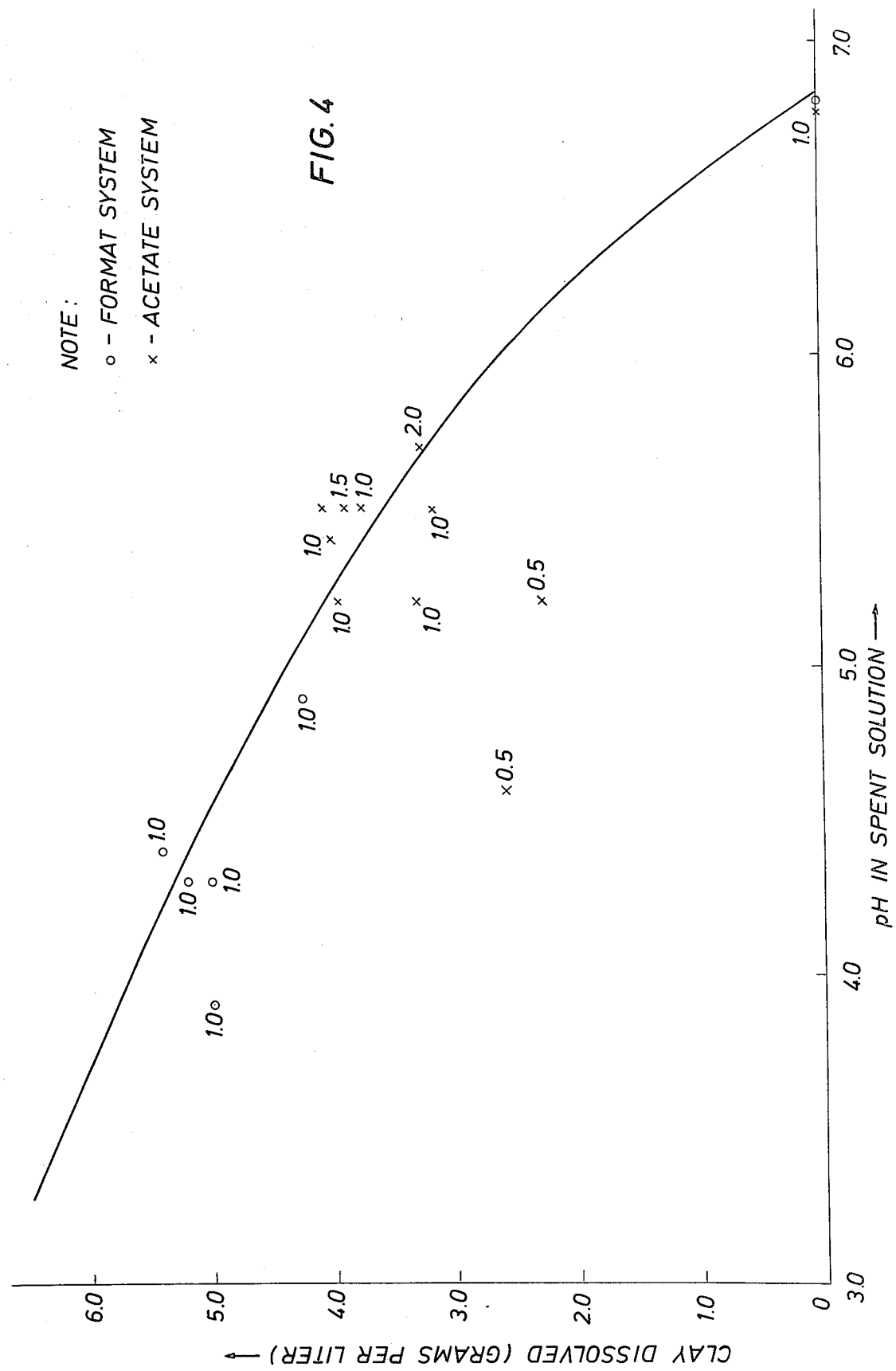
FIG. 4 graphically illustrates variations in the amount of clay dissolved with changes in the pH of mud acid solutions of the present invention.

FIG. 4 shows the variation in the equilibrium (or maximum) amounts of clay dissolved with changes in the pH of spent mud acid solutions. The numerical notations by the points on the figure are the initial fluoride concentrations in moles per liter. The compositions of the solutions are listed in Table 1.

Field Test

A field test was conducted in a well having a gravel pack in an unconsolidated reservoir sand in the Gulf Coast Region at a depth of about 7,560 ft. The zone to be acidized was pre-treated by injecting 400 gallons of xylene, 300 gallons of aqueous 15% hydrochloric acid containing 4 lbs. of citric acid, 750 gallons of aqueous 7-½% hydrochloric acid containing 1-½% hydrogen fluoride, and 800 gallons of aqueous 3% ammonium chloride. (Note: the percentages are based on weight per volume and each of the acid solutions contained a conventional corrosion inhibitor).

A buffer-regulated mud acid (BRMA) was compounded as follows: 783 gallons of water were mixed with 205 lbs. of ammonium bifluoride and 64 gallons of aqueous 3% ammonium hydroxide. Immediately before pumping, 140 gallons of 80% acetic anhydride was added. The solution was displaced into the well ahead of 23 barrels of aqueous 3% ammonium chloride at a fluid injection rate of about 1/4 bbl, per minute.

No problems were encountered in injecting the solution. Five days after the treatment, the well exhibited improvement. Prior to the treatment, it was producing at the rate of 70 bbls. of oil, 70 bbls. of water, and 70,000 cu. ft. of gas per day. After the treatment, it produced 103 bbls. of oil, 54 barrels of water, and 45,000 cu. ft. per day of gas through a restrictive choke of 16/64 inches.

What is claimed is:

1. A well treating process which comprises:
   flowing fluid into a well to contact a siliceous material to be acidized in or around the borehole of the well; and
   including in the fluid an aqueous solution of a fluoride salt, a weak acid, and a weak acid salt, in proportions that provide within the solution at the time it flows into the well a fluoride salt concentration equivalent to at least a clay-dissolving proportion of hydrogen fluoride, a weak acid concentration sufficient to convert at least an effective amount of fluoride salt to hydrogen fluoride, and a weak acid salt concentration sufficient to provide a ratio of weak acid to weak acid salt that limits the rate of the acidizing reaction.

2. The process of claim 1 in which the fluid is flowed into a subterranean reservoir containing a siliceous material.

3. The process of claim 2 in which the fluid is flowed into the reservoir during the forming or treating of a fracture.

4. The process of claim 1 in which a portion of strong acid is dissolved in the aqueous acidizing solution to cause an initially relatively rapid reaction.

5. The process of claim 1 in which the siliceous material is contacted with successive portions of the aqueous acidizing solution to acidize more than the amount of the material that would be acidized by a volume sufficient to merely immerse or permeate the material.

6. The process of claim 1 in which the fluoride salt is an ammonium salt of hydrofluoric acid and the weak acid and weak acid salt are, respectively, formic acid and ammonium formate.

7. The process of claim 1 in which the fluoride salt is an ammonium salt of hydrofluoric acid and the weak acid and weak acid salt are, respectively, acetic acid and ammonium acetate.

8. A process for acidizing a siliceous material in a remote location into which a fluid can be flowed, which comprises:
   flowing fluid into said remote location to contact the material to be acidized; and
   including in the fluid an aqueous solution which, at the time of its inclusion, contains an amount of fluoride salt equivalent to at least an effective amount of hydrogen fluoride for acidizing a siliceous material, at least enough weak acid to convert the fluoride salt to an effective amount of hydrogen fluoride, and enough weak acid salt to provide a ratio of weak acid to weak acid salt that limits the rate of siliceous material acidization to substantially a selected rate.

9. In a process for treating a well by injecting an acidic solution into the well to contact a siliceous material in or around the borehole, the improvement which comprises:
   compounding the acidic solution to be so injected by dissolving a fluoride salt, a weak acid, and a weak acid salt in an aqueous liquid in proportions providing an amount of fluoride salt equivalent to at least an effective amount of hydrogen fluoride for acidizing a siliceous material, at least enough weak acid to convert the fluoride salt to an effective amount of hydrogen fluoride, and enough weak acid to provide a ratio of weak acid to weak acid salt that limits the rate of acidization.

10. The process of claim 9 in which the amount of dissolved fluoride salt is equivalent to from about 0.1 to 3 moles per liter hydrogen fluoride, the amount of dissolved weak acid is at least enough to convert a significant proportion of the fluoride salt to hydrogen fluoride and the amount of dissolved weak acids salt provides a ratio of weak acid to weak acid salt that buffers the pH of the solution at a value of from 3 to 6.

11. The process of claim 9 in which the fluoride salt is an ammonium salt of a hydrofluoric acid and the weak acid and weak acid salt are, respectively, formic acid and ammonium formate.

12. The process of claim 9 in which the fluoride salt is an ammonium salt of hydrofluoric acid and the weak acid and weak acid salt are respectively acetic acid and ammonium acetate.

* * * * *